United States Patent [19]
Yamaguchi

[11] Patent Number: 5,159,183
[45] Date of Patent: * Oct. 27, 1992

[54] IC CARD

[75] Inventor: Atsuo Yamaguchi, Itami, Japan

[73] Assignee: Mitsubishi Denki Kabushiki Kaisha, Tokyo, Japan

[ * ] Notice: The portion of the term of this patent subsequent to Aug. 13, 2008 has been disclaimed.

[21] Appl. No.: 387,133

[22] Filed: Jul. 31, 1989

[30] Foreign Application Priority Data

Feb. 17, 1989 [JP] Japan .................... 1-36208

[51] Int. Cl.⁵ .................. G06K 5/02; G06K 9/03
[52] U.S. Cl. .................. 235/492; 235/380; 235/382; 364/DIG. 1; 364/232.8; 364/286; 364/286.4; 364/286.5
[58] Field of Search .......... 235/380, 382, 492; 364/200 MS File, 900 MS File

[56] References Cited

U.S. PATENT DOCUMENTS

| | | | |
|---|---|---|---|
| 4,709,136 | 11/1987 | Watanabe | 235/379 |
| 4,777,355 | 10/1988 | Takahira | 235/380 |
| 4,801,787 | 1/1989 | Suzuki | 235/382 |
| 4,849,614 | 7/1989 | Watanabe et al. | 235/382 |
| 4,885,788 | 12/1989 | Takaragi et al. | 235/382 |
| 5,016,212 | 5/1991 | Yamaguchi et al. | 364/900 |
| 5,039,850 | 8/1991 | Yamaguchi | 235/382.5 |

*Primary Examiner*—Allen R. MacDonald
*Assistant Examiner*—Debra A. Chun
*Attorney, Agent, or Firm*—Leydig, Voit & Mayer

[57] ABSTRACT

An intrinsic cipher code peculiar to each IC card is written and stored in EEPROM serving as a writable non-volatile memory in an IC card, as well as a routine for performing collation with the intrinsic cipher code before a test program is executed being stored in a read-only memory as to allow access to the test program when agreement is established. An attempt can thus be made to improve security for access to the test program.

3 Claims, 5 Drawing Sheets

IC CARD

BACKGROUND OF THE INVENTION

1. Field of the Invention

The present invention relates to an IC card, particularly to an IC card in which an application program used for executing various functions for using the IC card, as well as a test program used for executing tests (product inspections) on the IC card are stored.

2. Description of the Related Art

FIG. 1 is a block diagram of the configuration of a conventional IC card. In an IC card 10, a system ROM 3 and an application ROM 4 are connected to a CPU 1 through a bus 2. FIG. 2 is a flowchart which shows the configuration of the programs respectively stored in the system ROM 3 serving as a second read only memory and the application ROM 4 serving as a first read only memory. As shown in FIG. 2, for example, a test program 31 which is used by the maker for performing functional tests of the products during production of IC cards is stored in the system ROM 3, and an application program 41, which is actually used by the user for executing various functions, is stored in the application ROM 4. In the system ROM 3 is also stored a branch routine 32 which decides which program is to be executed from among the test program 31 and the application program 41 and which branches into one of these programs. In FIG. 1, EEPROM 5 in which variable data is stored, RAM 6 in which data is temporarily stored and an input-output circuit 7 for performing input and output of data between the circuit 7 and external devices are further connected to the bus 2. In addition, terminal P1 is a positive source input terminal, terminal P2 is a power source grounding terminal, terminal P3 is a reset signal terminal for inputting a reset signal used for initializing the CPU 1, terminal P4 is a clock terminal for inputting a clock signal, and terminal P5 is an I/O terminal.

In such an IC card, when a reset signal is input from the reset signal terminal P3, the CPU 1 reads the execute start address of the branch routine 32 which has been previously stored at a given address in the system ROM 3 and starts the execution of the branch routine 32 from the execute start address. In the branch routine 32, when a command to execute the test program 31 is input to the I/O terminal P5 from an external device, the CPU 1 starts the test program 31 without any other operations. The test program 31 can access any desired address for performing product tests (inspections); i.e., the CPU 1 can access each address in accordance with the test program 31, whereby product tests can be conducted. On the other hand, when no command to execute the test program 31 is input, the execute start address of the application program 41 which has been previously stored at a given address in the application ROM 4 is read, and execution of the application program 41 is started from the execute start address.

Conventional IC cards have the above-described configuration in which, when a command to execute the test program is received in the branch routine, the test program is executed without any other operations. As described above, the test program is a program used for functional tests (product tests) on a card and has the function of accessing any desired address in memory in the card. It is therefore necessary to impart a high degree of security for access to the test program, i.e., the execution thereof, in order to prevent the test program from being used for unauthorized reading, copying or breaking into other programs stored in an IC card and for changing the contents thereof. However, conventional IC cards are not provided with a means for regulating the access to the test program or the execution of the same.

SUMMARY OF THE INVENTION

The present invention has been achieved for the purpose of resolving the above-described problem, and it is an object of the present invention to provide an IC card which comprises means for regulating access to a test program so that other programs stored in the IC card cannot be copied or broken into through the test program without authorization.

In view of this object, the present invention provides an IC card which contains an application program used for executing various functions for using the IC card and a test program used for product tests, the IC card comprising writable non-volatile memory means in which an intrinsic cipher code peculiar to each IC card is stored and a write confirmation code for confirming that the intrinsic cipher code is written and stored; first read-only memory means in which an application program for executing various functions for using the IC card is stored; second read-only memory means containing a test program, a branch routine of which decides whether the test program or the application program is to be executed, a write confirmation routine for confirming that the intrinsic cipher code has already been written using the write confirmation code of the non-volatile memory means when a decision is made that the test program is to be executed, and a first cipher code collating routine which functions to collate the intrinsic cipher code with the cipher code input from the outside of the card when it is decided in the write confirmation routine that the intrinsic cipher code is written and which enables access to the test program when both the cipher codes coincide with each other; control means for executing and controlling each of the programs; input-output control means for controlling signal input from and output to the outside of the card; and means for transmitting signals between the other respective means; all of these means being disposed on a single semiconductor chip.

In another embodiment of the present invention, the second read only memory means further stores a cipher code different from the intrinsic cipher code and a second cipher code collating routine which collates the cipher code stored in the second read only memory means with the cipher code input from the outside of the card when it is decided in the write confirmation routine that the intrinsic cipher code is not written in the non-volatile memory means, and which enables access to the test program when the two cipher codes agree with each other.

In a further embodiment of the present invention, the write confirmation code written together with the intrinsic cipher code in the writable non-volatile memory means is a check code for the intrinsic cipher code, and a decision is made as to whether or not the intrinsic cipher code is correct in the write confirmation routine of the second read only memory means in accordance with the check code. If the intrinsic cipher code is correct, it is decided that the intrinsic cipher code is written.

In the present invention, collation with the cipher code stored in the card is performed before the test program is executed, and access to the test program is permitted only when agreement is realized.

DESCRIPTION OF THE EMBODIMENT

Figure 1:
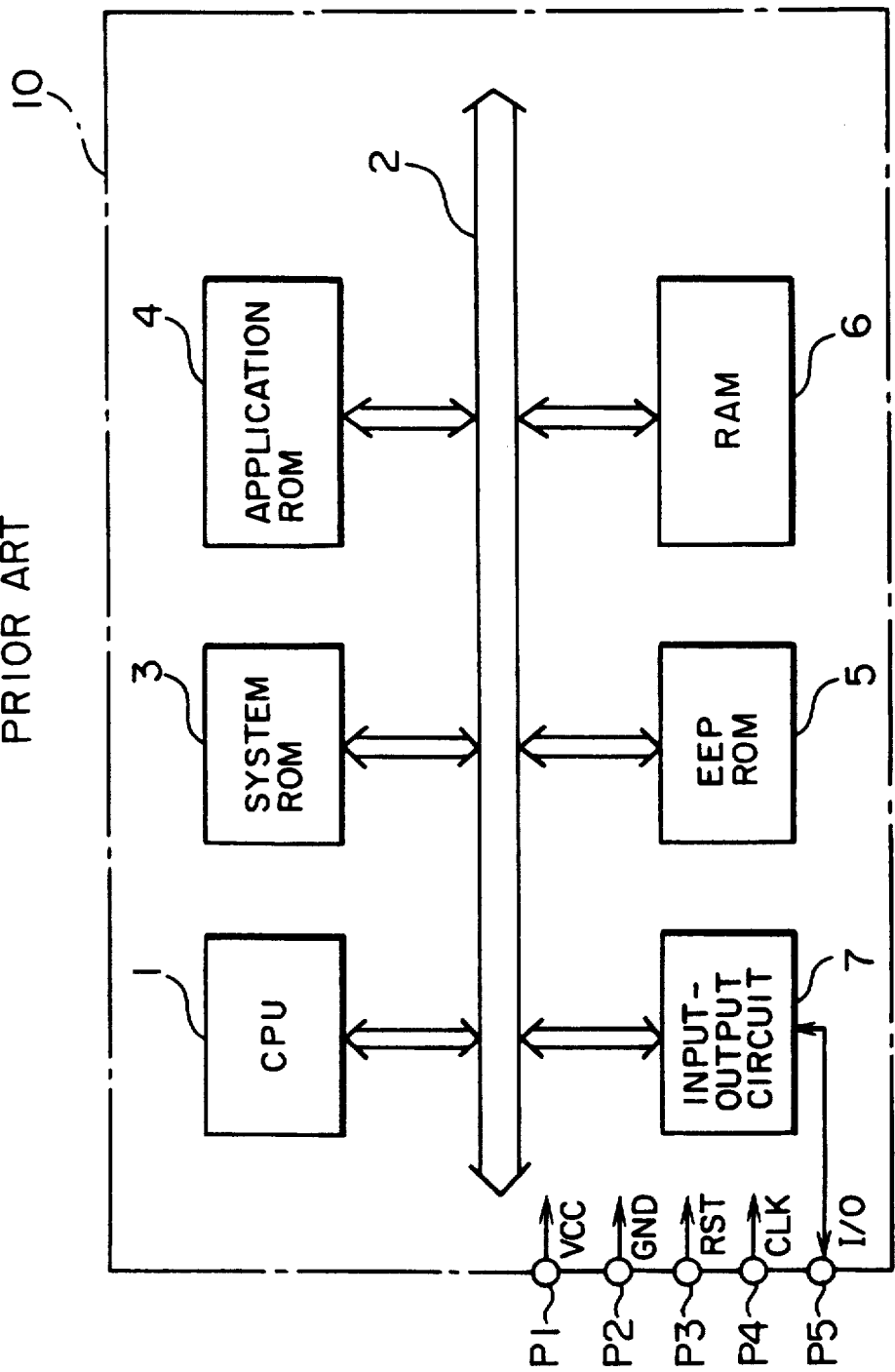
FIG. 1 is a schematic block diagram of the internal configuration of a conventional IC card.
Figure 2:
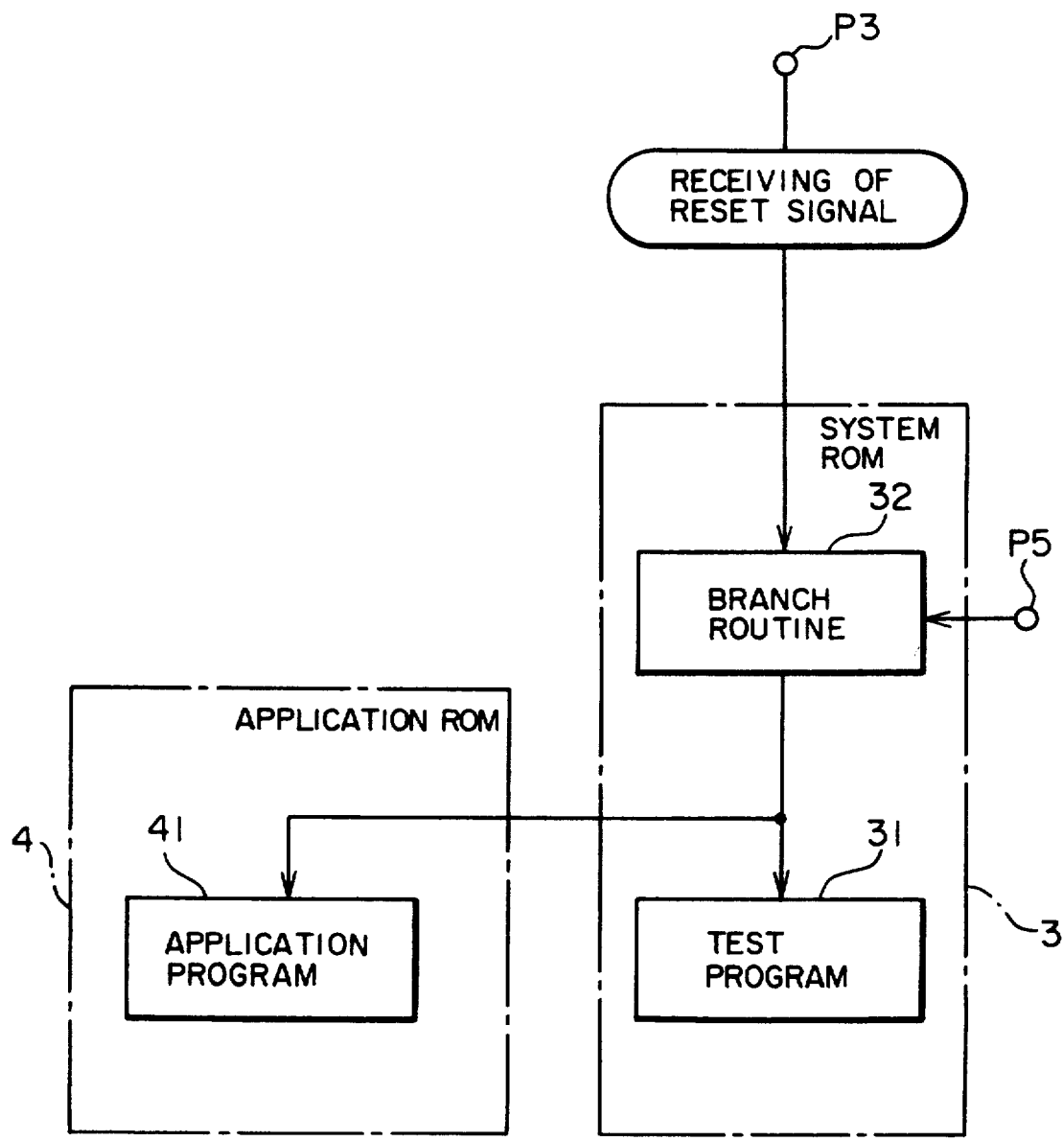
FIG. 2 is a flowchart which shows the configuration of the programs stored in the ROM unit of the IC card shown in FIG. 1.
Figure 3:
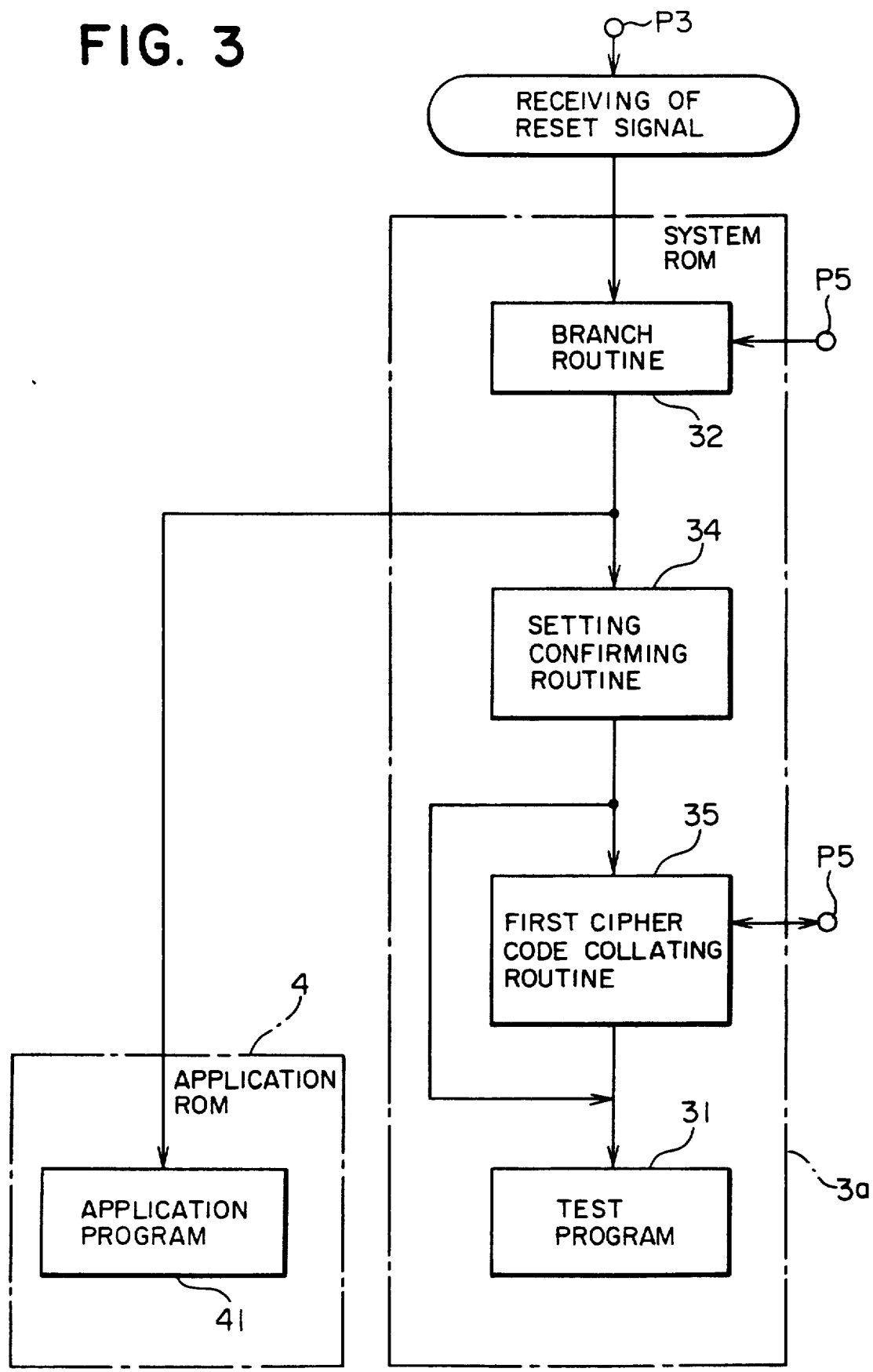
FIG. 3 is a flowchart which shows the configuration of the programs stored in the ROM unit of an embodiment of an IC card in accordance with the present invention.
Figure 4:
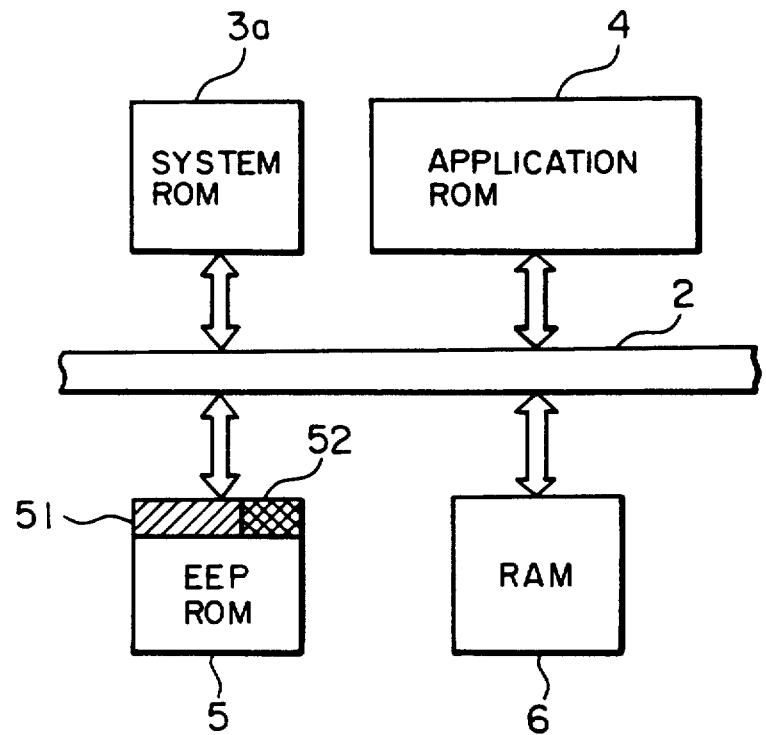
FIG. 4 is a drawing illustrating storage of a cipher code in the IC card shown in FIG. 3.

An embodiment of the present invention will be described below with reference to the drawings. The overall configuration of the IC card of the present invention is not particularly different from that of the conventional IC card shown in FIG. 1. FIG. 3 is a flowchart which shows the configuration of the programs stored in a system ROM 3a and an application ROM 4 of an IC card in an embodiment of the present invention. In this embodiment, an intrinsic cipher code 51 is written and stored in EEEPROM 5 serving as a non-volatile memory during the process of manufacturing an IC card, as shown in FIG. 4. This intrinsic cipher code 51 is collated with the cipher code input from the outside of the card before a test program 31 is executed, and the access to the test program 31 and execution thereof are possible only when agreement between these codes is confirmed. Also stored in EEPROM 5, is a setting confirmation code 52, which serves as a write confirmation code indicating that the intrinsic cipher code 51 is written, which is separate from the intrinsic cipher code 51. The setting confirmation code 52 of a given value signifies that the intrinsic cipher code 51 is already written, and the setting confirmation code of a value other than that given value signifies that the intrinsic cipher code 51 has not yet been written. A decision is made using the setting confirmation code 52 as to whether or not the intrinsic cipher code 51 has been already written and stored. The setting confirmation code 51 is set to a value which is different from the initial value of the EEPROM 5 during the production of the cards. This will be described in detail below in accordance with FIG. 3. When a reset signal is input from a reset signal terminal P3, the CPU 1 reads the address at which the execution of a branch routine 32 is started and which is previously stored at a given address in the system ROM 3a and starts the execution of the branch routine 32 from the execute start address. In the branch routine 32, the CPU 1 causes the execution of the setting confirming routine 34 when a command to execute the test program 31 is input to an I/O terminal P5 from an external device. In the setting confirming routine 34, it is decided from the setting confirmation code 52 stored in EEPROM 5 whether or not the intrinsic cipher code 51 has already been written in the EEPROM 5. When it is decided that the intrinsic cipher code 51 has already been written, the first cipher code collating routine 35 is executed. In the first cipher code collating routine 35, the intrinsic cipher code 51 stored in the EEPROM 5 is collated with the cipher code input from the I/O terminal P5, and access to the test program 31 is permitted only when the two codes agree with each other. Operation is stopped when the two codes do not agree with each other. Alternatively, when the intrinsic cipher code 51 has not yet been written, the test program 31 is directly executed without performing collation of the cipher codes. In other words, for example, when there is no need for imparting security particularly to access to the test program 31 in the factories the test program can be executed without the need for collation of the cipher codes if the intrinsic cipher code 51 has not been written. In this embodiment, since the cipher codes are stored in EEPROM, different cipher codes can be set for respective cards.

Figure 6:
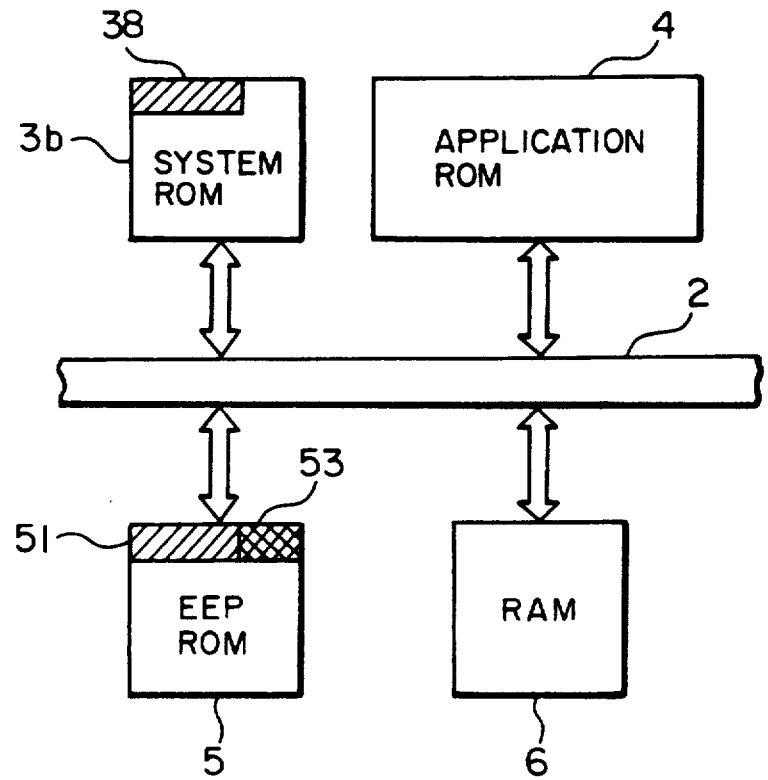
FIG. 6 is a drawing illustrating storage of the cipher code in the IC card shown in FIG. 5.
Figure 5:
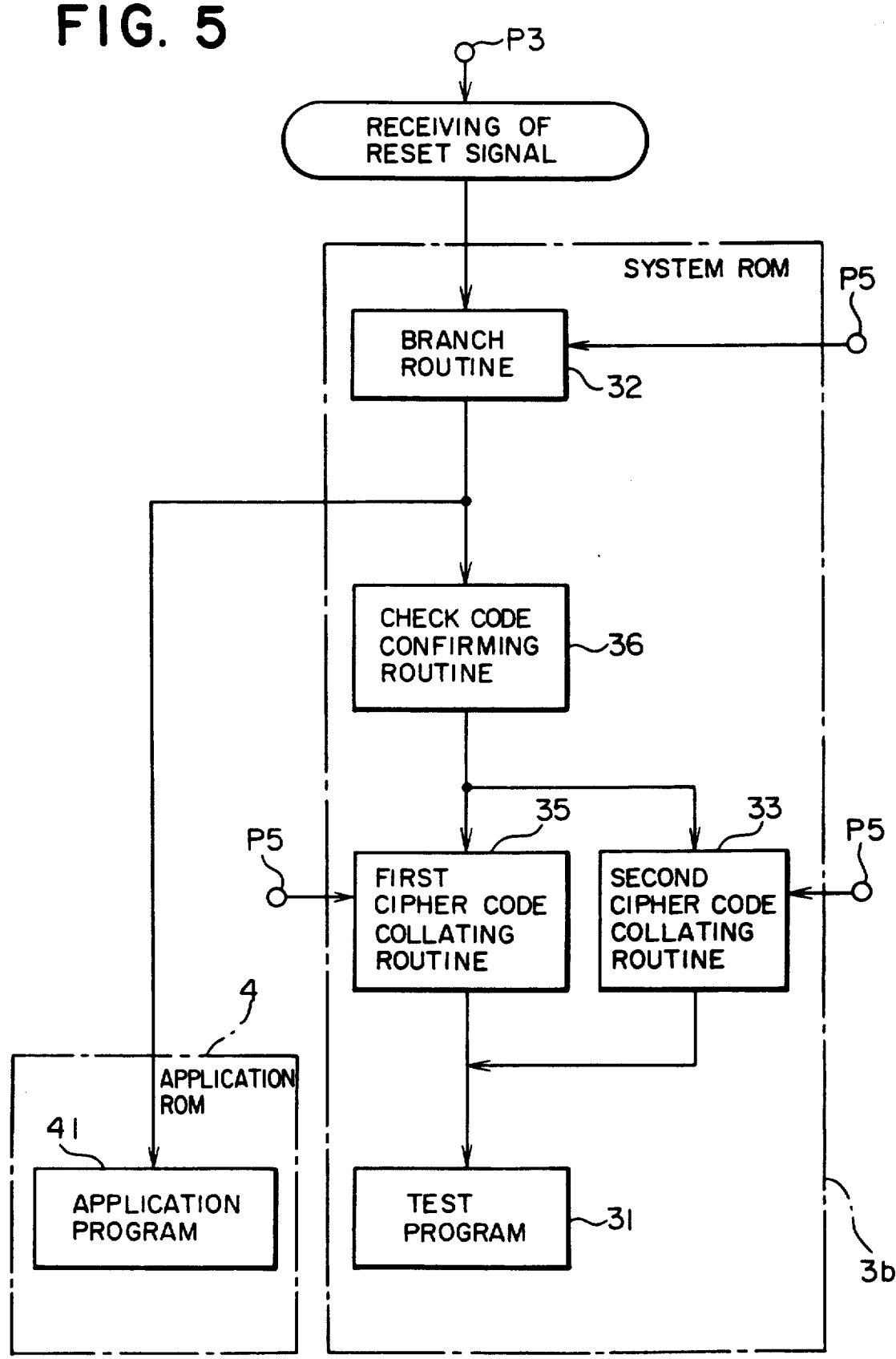
FIG. 5 is a flowchart which shows the configuration of the programs stored in the ROM unit of an another embodiment of the IC card in accordance with the present invention.

FIG. 5 is a flowchart which shows the configuration of the programs stored in the system ROM 3b and the application ROM 4 in an IC card in an another embodiment of the present invention. In this embodiment, collation with the cipher code 38 previously stored in the system ROM 3b shown in FIG. 6 is performed during the process of manufacturing the IC cards, and the test program 31 is started only when coincidence is realized. Different intrinsic cipher codes 51 are written in EEPROM 5 of the cards at the end of the manufacturing process, and access to the test program 31 is then permitted in accordance with the results of collation with the intrinsic cipher codes 51 written in EEPROM 5. In addition, a check code 53 serving as a write confirmation code used for deciding whether or not the intrinsic cipher code 51 is correct is written and stored in EE-PROM 5 at the same time the intrinsic cipher code 51 is stored therein. This operation will be described in detail below with reference to FIG. 5. When a command to execute the test program 31 is given from the branch routine 32, a check code confirming routine 36 stored in EEPROM 5 for deciding whether or not the intrinsic cipher code 51 is correct is executed. The decision is made as to whether or not the intrinsic cipher code 51 is correct by applying the check code 53 to the intrinsic cipher code 51. It is therefore necessary to decide the method of determining the check code 53 in such a manner that the check code 53 is not a correct value for the intrinsic cipher code 51 during the production process. When it is decided from the check code 53 that the intrinsic cipher code 51 is correct, it is determined that the intrinsic cipher code 51 has already been written, and the first cipher code collating routine 35 is executed for collating the intrinsic cipher code 51 written in EEPROM 5 with the cipher code input from the I/O terminal P5. The test program 31 is executed only when both the codes agree with each other, and the operation is stopped when they do not agree with each other. In addition, when it is decided in the check code confirming routine that the intrinsic cipher code stored in EE-PROM 5 is not correct, it is decided that the intrinsic cipher code 51 has not yet been written, and the second cipher code collating routine 33 is executed for collating the cipher code 38 previously stored in the system ROM 3c with the cipher code input from the I/O terminal P5. The test program 31 is executed only when both the codes agree with each other, and the operation is stopped when they do not agree with each other.

The check code 53 written in EEPROM 5 together with the intrinsic cipher code 51 may be simply the setting confirming code used for deciding whether or not the intrinsic cipher code 51 is written in the EEPROM 5, as described in the embodiment shown in FIGS. 3 and 4. On the other hand, it is a matter of course that the embodiment shown in FIGS. 3 and 4 may employ the check code 51 for the purpose of deciding whether or not the intrinsic cipher code has been written.

The stage at which the intrinsic cipher code 51 is written in the EEPROM 5 is not limited to the final stage of the production process. Collation with the cipher code stored in the system ROM may be performed before the intrinsic cipher code is written, and collation with the intrinsic cipher code written in EEPROM may be performed after the intrinsic cipher code has been written.

Furthermore, CPU, the input/output circuit, each memory and the bus to which these units are connected are all formed on a single semiconductor chip.

What is claimed is:

1. An IC card comprising:
    writable non-volatile memory means for storing an intrinsic cipher code exclusive to said IC card and a write confirmation code, the write confirmation code for confirming that said intrinsic cipher code is stored in said writable non-volatile memory means;
    first read-only memory means in which an application program for executing predetermined functions of said IC card is stored;
    second read-only memory means in which a test program having access to all of said first and second read-only memory means for testing the predetermined functions of said IC card is stored and including branch means for responding to data input from outside said IC card to select between said test program and said application program for execution, write confirmation means for determining from said write confirmation code stored in said non-volatile memory means whether said intrinsic cipher code is stored in said writable non-volatile memory means when said branch means responds to data input from outside said IC card selecting the test program for execution, and first cipher code collating means for collating said intrinsic cipher code with an external cipher code input from outside of said IC card when said write confirmation means determines that said intrinsic cipher code is stored in said writable non-volatile memory means and for execution of said test program when said intrinsic and external cipher codes agree with each other;
    control means for executing said application and test programs;
    input-output control means for controlling data and codes input from and data output to outside of said IC card; and
    a bus interconnecting said writable non-volatile memory means, said first read-only memory means, and said second read-only memory means for transferring signals therebetween wherein said writable non-volatile memory means, said first read-only memory means, said second read-only memory means, said control means, and said input-output control means are provided on a single semiconductor chip.

2. The IC card according to claim 1 wherein a check code is stored in said writable non-volatile memory means and a default cipher code is stored in said second read-only memory means, said write confirmation means includes means for collating said check code stored in said writable non-volatile memory means with said intrinsic cipher code, said write confirmation means determining that said intrinsic cipher code is stored in said writable non-volatile memory means if said intrinsic cipher code is correct, means for collating said intrinsic cipher code is correct, and means for collating said default cipher code with said external cipher code when said write confirmation means determines that said intrinsic cipher code is not stored or is not correct for execution of said test program only when said intrinsic cipher code is stored and is correct and said intrinsic cipher code and said external cipher code agree with each other or when said intrinsic cipher code is not stored or is correct and said default cipher code and said external cipher code agree with each other.

3. The IC card of claim 1 wherein said write confirmation means includes means for execution of said test program in response to data input from outside said IC card to select said test program when said write confirmation means determines that said intrinsic cipher code is not stored in said writable non-volatile memory means.

* * * * *

UNITED STATES PATENT AND TRADEMARK OFFICE
CERTIFICATE OF CORRECTION

PATENT NO. : 5,159,183

DATED : October 27, 1992

INVENTOR(S) : Atsuo Yamaguchi

It is certified that error appears in the above-identified patent and that said Letters Patent is hereby corrected as shown below:

Item no. 57, Abstract, line 6, delete "as".

Claim 2, col. 6, line 21, please substitute the entire claim with:

-- The IC card according to Claim 1 wherein a check code is stored in said writable non-volatile memory means and a default cipher code is stored in said second read-only memory means, said write confirmation means includes means for collating said check code stored in said writable non-volatile memory means with said intrinsic cipher code, said write confirmation means determining that said intrinsic cipher code is stored in said writable non-volatile memory means if said intrinsic cipher code is correct, means for collating said intrinsic cipher code with said external cipher code when said intrinsic cipher code is correct, and means for collating said default cipher code with said external cipher code when said write confirmation means determines that said intrinsic cipher code is not stored or is not correct for execution of said

UNITED STATES PATENT AND TRADEMARK OFFICE
CERTIFICATE OF CORRECTION

PATENT NO. : 5,159,183

DATED : October 27, 1992

INVENTOR(S) : Atsuo Yamaguchi

It is certified that error appears in the above-indentified patent and that said Letters Patent is hereby corrected as shown below:

```
test program only when said intrinsic cipher code
is stored and is correct and said intrinsic cipher code
and said external cipher code agree with each other or
when said intrinsic cipher code is note stored or is
correct and said default cipher code and said external
cipher code agree with each other.--.
```

Signed and Sealed this

Fifth Day of October, 1993

Attest:

BRUCE LEHMAN

Attesting Officer

*Commissioner of Patents and Trademarks*